July 12, 1966  H. DUBOIS  3,260,010
FISHING ROD
Filed May 24, 1963
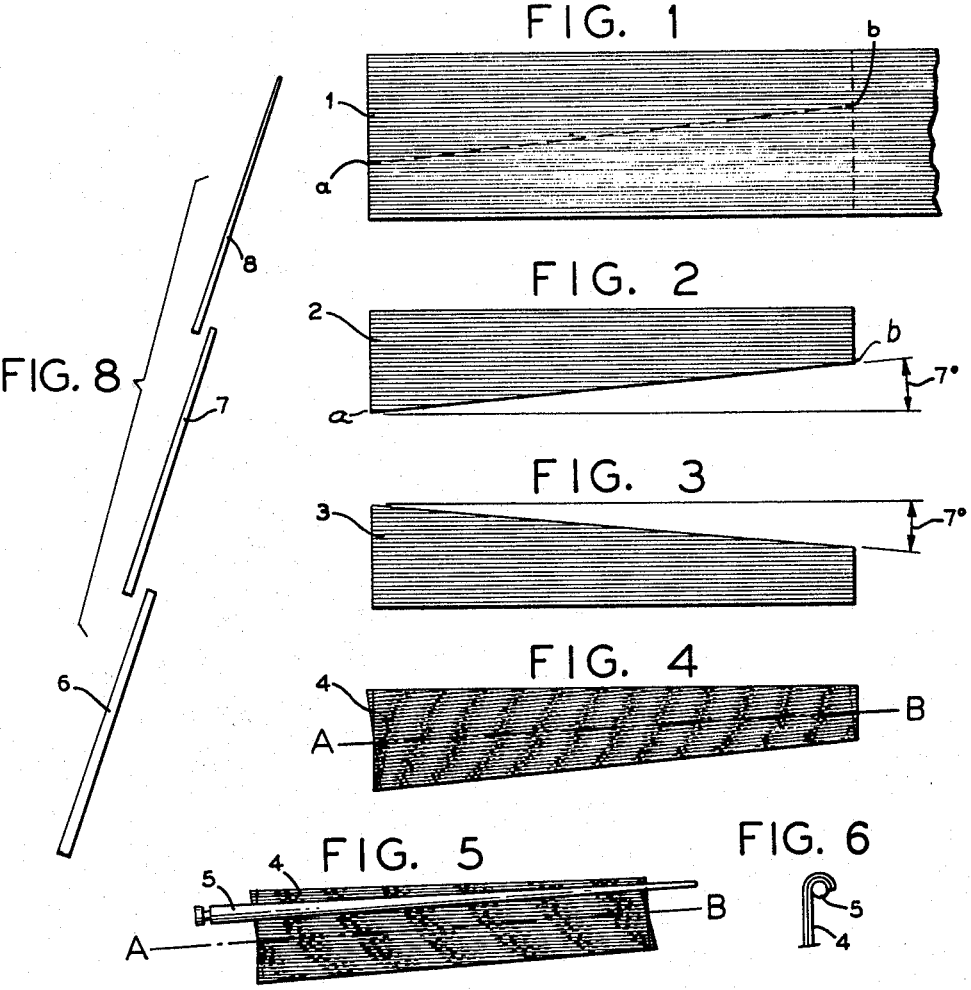
INVENTOR.
Henri Dubois
BY
ATTORNEY.

United States Patent Office 3,260,010
Patented July 12, 1966

3,260,010
FISHING ROD
Henri Dubois, 23 Rue Henri Barbusse,
Levallois-Perret, France
Filed May 24, 1963, Ser. No. 283,671
Claims priority, application France, June 22, 1962,
901,561
4 Claims. (Cl. 43—18)

The present invention relates to improved cylindrical or conical tubes of plastic material reinforced with glass fibers and especially adapted for use as tubular fishing rods.

A tubular fishing rod composed of one section or of more than one section must be sufficiently rigid in order not to bend too much under the vigorous impulse it receives at the moment of casting, must be elastic and must revert to its original shape immediately after having been bent. In addition to the bending strain to which it is subjected, it must resist the crushing strains of its annular section at the moment of maximum curvature.

These requirements and others are set forth in my earlier patent, No. 2,571,692 dated October 16, 1951. At present, the pieces are formed of a synthetic material composed of glass fibers covered with synthetic resin. Further, in order to meet the bending strain, about 85% of the glass fibers used for the composition of the material are orientated parallel to the axis of the rod, while the remainder, i.e., 15%, are disposed perpendicularly to the former and are not stressed on flexing. They only resist crushing.

Applicant has found that, by using another concept of orientation, it becomes possible to cause all glass fibers going into the composition of the material, to be stressed on flexing, while ensuring a rigidity of the tube which resists crushing.

The problem no longer consists in using fibers, a portion of which are disposed perpendicularly to the other portion, but, on the contrary, in orientating all fibers, the ones and the others, along a very slight suitable angle in such a manner that, by superposing them, they form between them an acute angle, each point of contact of which resists their sliding, ensuring crushing strentgh, while all support the flexural stresses which are increased.

The invention will be better understood by way of the accompanying drawing, in which:

FIG. 1 shows the synthetic material utilized by me in the manufacture of my fishing rod;

FIGS. 2 and 3 illustrate the strips that are formed from the material of FIG. 1 through the cutting of the said material;

FIG. 4 shows the assembly of the strips of FIGS. 2 and 3 in superimposed relation;

FIG. 5 shows the assembled strips of FIG. 4 together with the mandrel applied thereto prior to the winding of the strips about the mandrel;

FIG. 6 shows the relationship of the mandrel to the strips at the start of the winding;

FIG. 7 shows the relationship of the various strips to one another in the fishing rod; and FIG. 8 shows three pieces of the fishing rod prior to assembly.

The synthetic material is designated by reference numeral 1 and is composed, as known per se, of glass fibers juxtaposed side by side and embedded in a synthetic resin to form a glass fiber cloth called: unidirectional—FIG. 1.

FIGS. 2 and 3 show the shapes of the strips 2 and 3 cut out from the cloth of FIG. 1, where according to one of the features of the invention, the cutting out is effected along a line $a, b$ at an angle of 7° with respect to the direction of the fibers, the lengths and widths being calculated according to the size of the rod piece in question.

Another feature of the invention relates to the assembling of the cut-out strips 2 and 3. These strips 2 and 3 which are assembled in twos by being placed one on top of the other in such a manner that the 7° inclination of the fibers of one strip is opposed to the other all as seen in FIG. 4 in which the composite strip formed by strips 2 and 3 is designated by reference numeral 4. In FIG. 4, the relatively thick lines represent the strip 3, while the dotted lines show strip 2.

The assembly of said two strips formed in this manner is ready to receive a metallic take-up mandrel or core about which they are wound all as shown in FIGS. 5 and 6.

The winding is characterized by the position of the core or mandrel 5 which should preferably be parallel to the generatrix A, B of the composite strip 4 formed by superposed strips 2 and 3.

In FIG. 7, the fishing rod formed in accordance with the teachings of my invention is illustrated with parts of the layers of the material cut away to illustrate the positioning of the fibers.

The selected angle of 7° is the preferred optimum angle to present the correct connection of the fibers with respect to each other at each crossing, without the ones sliding under the other owing to the flexural stress.

Due to the tendency of overlapping, a smaller angle would have the effect of no longer ensuring a sufficient resistance to crushing; inversely, a larger angle would increase said resistance, but would decrease the resistance to bending, which falls much more quickly than the increase of the angle.

Placed under said angle, all glass fibers used for making the pieces are stressed 100% on flexing, the resistance of which is increased. Of course, variations from my recommended optimum may be made while still utilizing the contribution of my invention.

After the two twin strips have been wound about the mandrel, there follows heat curing to set the resin, stripping, finishing, and mounting according to the conventional such as discussed in the Scott Patent No. 2,749,643 methods.

A so-called "tubular" fishing rod carried out in this manner and consisting of one or more "pieces" is either more powerful while having the same weight as, or is lighter while having the same strength as a fishing rod produced according to other methods.

I claim:

1. A fishing rod formed as a hollow tube with the walls of the tube formed of rolled layers of glass fiber material in which the fibers of one layer are at an acute angle of substantially 7° relatively to the fibers in the next superimposed layer, and with the center line of said acute angle in substantial alignment with the longitudinal axis of said rod.

2. A glass fiber fishing rod formed as a tube with the walls of the tube comprising rolled layers of strips of glass fiber material of the type in which the fibers lie in parallel lines, each layer comprising two superimposed strips of said material so positioned relatively to one another that the fibers of the strips are at a relatively small acute angle relatively to one another and with the center line of the acute angle in substantial alignment with the longiudinal axis of said rod.

3. A glass fiber fishing rod formed as a tube with the walls of the tube comprising rolled layers of strips of glass fiber material of the type in which the fibers lie in parallel lines, with each strip rolled relatively to the longitudinal axis of the rod with said axis at an angle of but a few degrees from parallel to the glass fibers of each strip, and with said strips alternating in angularity so that the fibers of one rolled strip are at an acute angle relatively to the fibers of the next superimposed strip.

4. A glass fiber fishing rod formed as a tube with the walls of the tube comprising rolled layers of strips of glass fiber material of the type in which the glass fibers lie embedded in parallel lines, the fibers of one rolled strip laying at an acute angle relatively to the fibers of the next superimposed strip with the center line of the acute angle in substantial alignment with the longitudinal axis of said rod and the said acute angle contributing optimum flexibility and crush resistance at substantially 7°.

References Cited by the Examiner

UNITED STATES PATENTS

| | | | |
|---|---|---|---|
| 1,323,039 | 11/1919 | Frederick | 154—110 |
| 2,025,830 | 12/1935 | Rosmait | 154—2 |
| 2,133,137 | 10/1938 | Hackett | 154—2 |
| 2,159,795 | 5/1939 | Harsted | 43—18 |
| 2,594,838 | 4/1952 | Alexander et al. | |
| 2,742,931 | 4/1956 | Ganahl. | |
| 2,749,643 | 6/1956 | Scott | 43—18 |
| 2,785,442 | 3/1957 | Boggs. | |

FOREIGN PATENTS 553,616   12/1956   Italy.

SAMUEL KOREN, *Primary Examiner.*

MELVIN D. REIN, *Examiner.*